United States Patent
Robbiani et al.

[11] Patent Number: 5,984,506
[45] Date of Patent: Nov. 16, 1999

[54] METHOD AND DEVICE FOR CONTROLLING A MACHINE TOOL, IN PARTICULAR, AN ELECTRICAL DISCHARGE MACHINE

[75] Inventors: Fabrizio Robbiani, Bissone; Renzo De Maria, Bellinzona, both of Switzerland

[73] Assignee: AG fur industrielle Elektronik AGIE Losone bei Locarno

[21] Appl. No.: 08/838,731

[22] Filed: Apr. 10, 1997

[30] Foreign Application Priority Data

Apr. 10, 1996 [DE] Germany .................. 196 14 201

[51] Int. Cl.⁶ ............................................ G06F 19/00
[52] U.S. Cl. ........................... 364/474.04; 364/474.16
[58] Field of Search ................. 364/474.02, 474.16, 364/474.11, 474.04, 474.19

[56] References Cited

U.S. PATENT DOCUMENTS

| | | | |
|---|---|---|---|
| 4,442,493 | 4/1984 | Wakai et al. ........................ | 364/475 |
| 4,484,287 | 11/1984 | Gamo et al. ........................ | 364/474 |
| 4,550,378 | 10/1985 | Nozawa et al. .................... | 364/474 |
| 4,597,040 | 6/1986 | Buizer ................................. | 364/170 |
| 4,723,219 | 2/1988 | Beyer et al. ........................ | 364/474 |
| 5,182,474 | 1/1993 | Kaneko .............................. | 219/69.18 |
| 5,189,624 | 2/1993 | Barlow et al. ..................... | 364/474.11 |
| 5,453,592 | 9/1995 | Takeuchi et al. .................. | 219/69.17 |
| 5,480,348 | 1/1996 | Mazur et al. ....................... | 453/10 |
| 5,571,426 | 11/1996 | Akemura ............................ | 219/69.17 |
| 5,637,240 | 6/1997 | Izumiya et al. .................... | 219/69.17 |
| 5,742,018 | 4/1998 | Akemura ............................ | 219/69.13 |

FOREIGN PATENT DOCUMENTS

| | | |
|---|---|---|
| 0 606 649 A2 | 7/1994 | European Pat. Off. . |
| 0 700 745 A1 | 3/1996 | European Pat. Off. . |
| 26 42 453 A1 | 8/1978 | Germany . |
| 26 42 453 C2 | 7/1982 | Germany . |
| WO 89/07503 | 2/1989 | WIPO . |
| WO 96/12218 | 9/1995 | WIPO . |

OTHER PUBLICATIONS

Excerpt—"Object–Oriented Programming Reusing and Reprogramming NC Programs" by Walter Eversheim.

*Primary Examiner*—Paul P. Gordon
*Assistant Examiner*—Iván Calcaño
*Attorney, Agent, or Firm*—Gifford, Krass, Groh, Sprinkle, Anderson & Citkowski, P.C.

[57] ABSTRACT

A control device for controlling a machine tool includes at least one memory for storing control data characterizing the instantaneous operating state of the machine tool during machining and a memory management device for managing the control data such that machining can be resumed after an interruption. The control data is separated into dynamic control data and static control data. The method for controlling a machine tool uses the control device and stores the static and dynamic control data in the memory. As a workpiece is machined, the instantaneous operating state of the machine tool is continuously stored so that machining can be resumed after an interruption.

8 Claims, 1 Drawing Sheet

METHOD AND DEVICE FOR CONTROLLING A MACHINE TOOL, IN PARTICULAR, AN ELECTRICAL DISCHARGE MACHINE

FIELD OF THE INVENTION

The invention pertains to a method and a device for controlling a machine tool, in particular, an electrical discharge machine, by means of a control device that contains the control data required for processing one or more workpieces.

BACKGROUND OF THE INVENTION

Most machine tools of this type comprise a numerical control, e.g., a NC control or a CNC control. The control data required for the numerical control, e.g., position and/or path or contour data for the desired workpiece machining, is fed to the control device in the form of control inputs and subsequently converted into control signals for the servo drives of the machine tool.

One example of such a machine tool is an electrical discharge machine, i.e., an erosive die sinking or erosive cutting machine. Such electrical discharge machines are used, among other purposes for the manufacture of stamps and/or dies of conductive materials. One advantage of such machines can be seen in the extremely high precision. One particularly economical utilization of such electrical discharge machines is the manufacture of tool molds for the mass production of tools. In this case, it the individual control data, i.e., only the control data for a given workpiece must be entered before the machining of one or more workpieces. In addition to the definition of the desired machining steps to be carried out on the workpiece, corresponding control data that describes the processing sequence of the respective machine must be entered for each machine type.

The initially mentioned control methods according to the state of the art require control inputs in the form of closed routine "programs" or so-called sequential control programs. Such a program comprises all control data and, for example, defines the quality, machine parameters, sequence, position on the workpiece to be machined, etc., of the cutting paths to be traveled. The control data is defined in the form of a sequence of commands. In this case, a command that corresponds to a certain machining step remains active until a new machining step in the command sequence of the control program is defined by a new command. The machining sequence is strictly defined for each individual type of machine tool. If an intentional or unintentional interruption of the machine occurs during the sequential machining of a workpiece, e.g., a defect that cannot be immediately repaired, the machine operator is forced to continue the machining on another machine. For this purpose, the machine operator must completely readjust the sequential control program, i.e., the operator must read in and start the control program. In addition, the machine operator may be required to adapt the control program to the new machine tool. The entire machining sequence is carried out again on the other machine, i.e., the same workpiece is passed through in quasi-idle fashion until the condition at the time of the interruption is reached. Consequently, the machine again travels along the entire contour, in certain instances even several times. In this case, it may occur that additional material is removed and the already machined surface is damaged. This represents a particularly critical aspect in erosive trimming processes. If a workpiece is, again clamped in another machine, for example, this risk becomes much higher. Although this risk can be partially eliminated by means of complicated aligning methods, damage to the workpiece surface while the machine again travels along the workpiece contour, e.g., when producing a cut with the wire electrode of an erosive cutting machine, cannot always be prevented. Under certain circumstances, it is more practical to use a new, unmachined workpiece and to remachine the entire workpiece. In this case, the originally machined workpiece is discarded as waste and lost.

In addition, machine tools represent relatively expensive systems, i.e., such machine tools should operate over 24-hour periods. Today, a variety of automatic feed devices is available for this purpose such that an arbitrary number of workpieces can be automatically processed if the machine operator is not present for extended periods of time. Consequently, the demands for flexibility of modern machine tools are very high. However, the machine operator or the production manager is essentially responsible for selecting a sensible machining sequence for the given orders so as to prevent bottlenecks during the processing of orders. In practical applications, it is, however, frequently required immediately to process an unexpected order that is extremely urgent. This means that it must be possible to move a workpiece to another fixture of the same machine or to another machine so as to process a special order.

SUMMARY OF THE INVENTION

Known control methods and devices for machine tools are unable to fulfill this requirement.

The present invention aims to eliminate this disadvantage and increase the machining flexibility of the machine tool, in particular, an electrical discharge machine.

In the method according to the invention for controlling a machine tool, in particular, an electrical discharge machine, by means of a control device, all control data that characterizes the instantaneous machining state is stored to the control device during machining and managed with respect to resuming machining after an interruption. For this purpose, and as shown in FIG. 1 the control device 10 according to the invention comprises at least one memory 21 for storing the instantaneous control data and a memory management device 14 for managing the control data in the aforementioned fashion.

DETAILED DESCRIPTION OF THE PREFERRED EMBODIMENTS

Figure 1:
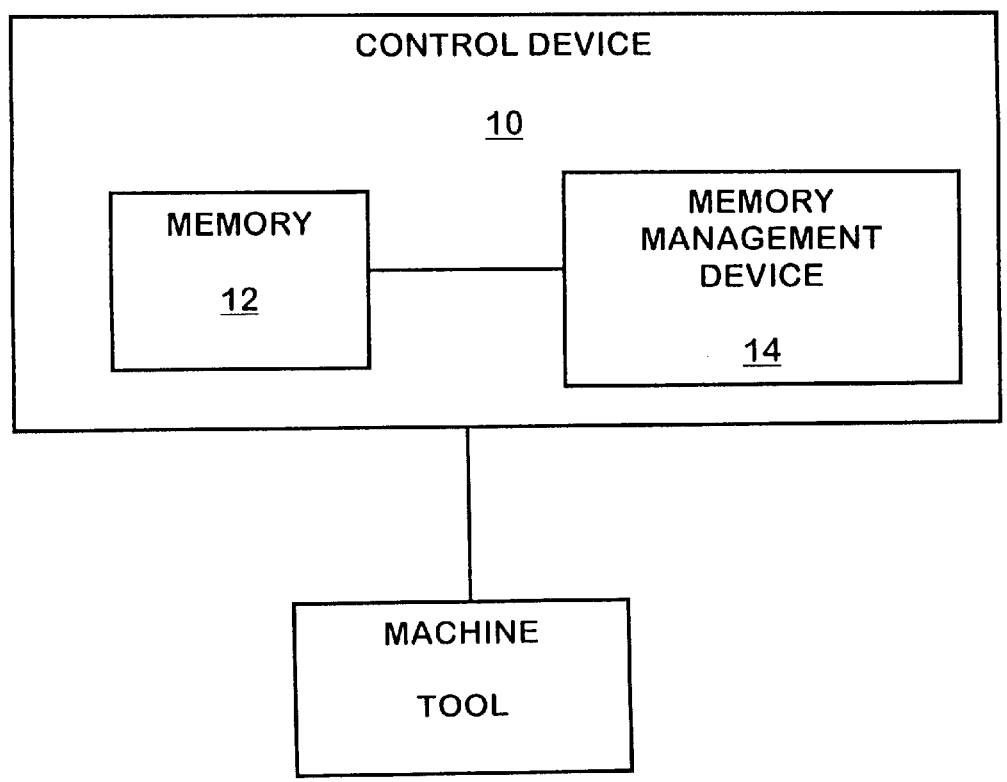
FIG. 1 is a block diagram of a control device according to the present invention shown connected to a machine tool.

The term instantaneous machining state refers to all information required by the control device for carrying out the current machinery step, e.g., erosion parameters such as operating current and voltage, wire parameters such as voltage and advance speed, flushing parameters and the like of an erosive cutting machine, data pertaining to the machining contour, the workpiece geometrical accuracy, and technological parameters such as roughness, position, etc. The invention provides a type of snapshot of the current machining state and continuously stores said snapshot in the control device. If a machining interruption occurs, all current control data is still available such that the machine operator is able to ascertain the machining state at the time at which the interruption occurs and resume the machining beginning with this state. In conventional control methods, all machining must be repeated from the beginning after an interruption.

According to the invention, machining may be continued on the same machine or, if so required, on another machine if, for example, a complete failure of the original machine occurs.

The control data is preferably stored in the control device in the form of dynamic control data, i.e., control data that characterizes changes in the operating states, and in the form of static control data, i.e., control data that characterizes operating states that remain the same during the entire machining process, i.e., so-called standard states, and managed correspondingly. According to the invention, only the instantaneous dynamic data is stored during the processing. The static data, in contrast, has a fixed value from the beginning of machining such that one is able to fall back on this data in case of an interruption. According to this variation, the invention provides a type of "differential" snapshot of the current operating state, i.e., with respect to only the changes of the current operating state. This measure significantly reduces the memory expenditure as well as the expenditure for memory management.

The closed routine control program known from the state of the art is essentially divided into two types of data, i.e., the sequential control data is replaced with two types of control data, static and dynamic control data. In this case, the current value of the latter is continuously monitored and stored. All dynamic control data is continuously "tracked" during machining such that the current operating state of the machine is known if a sudden interruption in machining, e.g., a defect, occurs and all prerequisites for resuming the processing on the same or another machine are provided.

According to one particularly user-friendly variation of the invention, all control data—i.e., static and dynamic control data—is preferably stored before, during and/or after the machining of a workpiece with only one command and transferred to another machine tool with one additional command so as to resume machining on the other machine. In this case, the data is preferably transferred by means of a data carrier (diskette, etc.) and/or a data connection, e.g., a LAN (local area network) or a WAN (wide area network).

The control data is preferably assigned to individual objects of the workpiece machining which are hierarchically managed by the control device, such that the control data of an object of hierarchically higher order also applies to all objects of lower order than this object. For example, such an object pertains to the machining of a pallet with several workpieces, the machining of a group of workpieces (a so-called batch), the machining of a special workpiece, the machining within a special group of machining steps or a special, individual machining.

In contrast to known control methods, individual machining steps are no longer isolated and arranged in a fixed sequence of commands, but rather described as states of or measures on machining objects of the machine tool that are subsequently carried out on the objects to be processed. Consequently, the control device according to the invention manages all control data with respect to the aforementioned objects of the machine tool, i.e., with respect to the effects particular control data has on the machining of a particular object. The proposed object-oriented structure of the data management is exceptionally useful for ensuring a rapid and efficient programming of the machine tool as well as an equally efficient adaptation of the control program to new circumstances after an interruption, e.g., to a new workpiece environment or to another machine tool.

Even if the machining by a machine tool is unintentionally interrupted, it can be easily resumed on another machine beginning with the state at which the interruption occurred, i.e., on the object that was machined in accordance with the instantaneous machining strategy. The machining on different machine types may also be combined in the desired fashion when complex workpieces are processed.

According to the aforementioned object structure, it is advantageous to categorize the dynamic control data and the static control data in such a way that the dynamic control data pertains to the respective machining state of an object during the entire machining process, i.e., if the machining of the respective object has begun, is already complete or has been interrupted for any reason, geometric and/or technological correction values in comparison to standard adjustments with respect to a basic geometry or basic technology of the respective machine that forms the basis for the entire machining process, wherein the geometric correction value comprises, for example, the machine position, the workpiece position, starting points, machining positions, etc., special priorities of the workpiece machining, e.g., the preference of certain workpiece types due to an urgent delivery order, and/or special machining strategies with respect to individual machining steps, e.g., cutting sequences during erosive machining, and that the static control data pertains to a basic geometry of the entire machining process and/or a standard technology, in particular, with respect to the surface roughness, the accuracy of the contour and the accuracy of corners.

Consequently, the instantaneous operating state can be recorded during an interruption in order to subsequently resume the machining.

In addition, a series of data pertains to the specific machine, e.g., the machine type, options, variations, accessories (interfaces, filter systems, wire position sensors, clamping means, robotic systems, etc.). In one preferred variation of the control method according to the invention, control data that pertains to the specific machine is also transferred to another machine tool and checked with respect to its compatibility. Before the machining is resumed, this compatibility check is carried out so as to determine if the machining that was interrupted on the first machine can be resumed on the second machine. An automatic data check is carried out in this fashion such that even inexperienced machine operators are able to operate different types of machines.

According to an additional variation, it is proposed that the control device check for possible negative effects of the interruption, e.g., on the machining quality, the displacement paths for retracting the wire guide heads of an erosive cutting machine, etc., before an intentional interruption to the machining process. An accidental interruption to the machining process may render the workpiece unusable and is consequently very expensive. It is practical that the machine not interrupt current machining process, but rather carry out an investigation concerning whether, for example, the machining of the entire workpiece should be finished, if the current machining step should be completed, if an actual interruption is required, etc.

Additional advantages of the invention are described below with reference to two examples of the control method according to the invention. In this case, the invention is described with respect to an erosive cutting machine. However, the invention is not limited to this embodiment, but may be widely utilized in the field of machine tool technology.

Such an erosive cutting machine usually comprises a numerical control that controls the relative movement between the workpiece and the electrode which is required for machining the workpiece and defines the cutting geometry. For this purpose, a X/Y-drive unit that can be moved in the direction of the main X/Y axes and is coupled to the workpiece table is provided. This drive unit receives the control signals from the control device. The control device requires a control program that contains control data, e.g., position data of one or more workpieces fixed on the workpiece table, path or contour data of the desired cutting geometry as well as machining parameters such as surface roughness, cutting accuracy, etc. This control data is converted into control signals for the X/Y drives. Before the machining sequence begins, the machine operator must "adjust" the machine by defining the aforementioned control data for the respective machining sequence.

Case 1

The initial machinng of a workpiece by means of the aforementioned erosive cutting machine proves to be unsatisfactory and must be repeated. In the meantime, the machining of an additional workpiece was started on the same erosive cutting machine. However, the machining of the second workpiece should be immediately interrupted, because the contract between the customer and the manufacturer stipulates that price reductions will go into effect if the delivery date of the first workpiece is delayed.

If the machining of the second workpiece is interrupted, the control method according to the state of the art is lost because the initial machining of a new workpiece is repeated and the machining of the second workpiece is repeated in its entirety from the beginning.

The control device according to the invention preferably interrupts the machining of the second workpiece after the current machining step is completed and stores all data pertaining to the current machining. After repeating the initial machining of a new workpiece, the machining of the second workpiece is resumed in the machining state in which it was interrupted.

Case 2

In this case two erosive cutting machines according to the invention are provided. The first erosive cutting machine has a chucking surface of 500×700 mm and the second erosive cutting machine has a chucking surface of only 250×350 mm. A pallet that contains several workpieces and is currently situated on the larger machine must also be machined on the smaller machine because a more important order that cannot be processed within the limited space of the smaller machine must be machined on the larger machine. According to the invention, the machine operator is able to transfer all required control data to the smaller machine, e.g., via a LAN, and resume the machining in the state in which the machining on the larger machine was interrupted. Consequently, the larger machine is available for machining the more important order.

We claim:

1. A method for controlling a machine tool, said method comprising the steps of:
   a) providing a control device for controlling a machine tool, said device comprising at least one memory for storing control data characterizing the instantaneous operating state of the machine tool during machining, the control data comprising dynamic control data and static control data, said control device further comprising a memory management device for managing the control data such that machining can be resumed after an interruption;
   b) storing the static and dynamic control data in said at least one memory;
   c) machining a workpiece; and
   d) continuously storing the instantaneous operating state of the machining tool during the machining step, said storing comprising storing only the dynamic data.

2. Method according to claim 1, characterized by the fact that the control data is stored before, during and/or after the machining of a workpiece with only one command and transferred to another machine tool with one additional command so as to resume the machining on the other machine.

3. Method according to claim 2, characterized by the fact that the control data is transferred by means of a data carrier and/or a data connection, e.g., a LAN or a WAN connection.

4. Method according to claim 1, characterized by the fact that the control data is assigned to individual objects of the workpiece machinery which are hierarchically managed by the control device, such that the control data of an object of hierarchically higher order also applies to all objects of lower order than this object.

5. Method according to claim 4, characterized by the fact that the dynamic control data pertains to
   the machining states of each object during the entire machining,
   geometric and/or technological correction values,
   special priorities of the workpiece machining, and/or
   special machining strategies, in particular, cutting sequences during erosive machining, and that the static control data pertains to
   a basic geometry of the entire machining process and/or
   a standard technology, in particular, with respect to the surface roughness, the accuracy of the contour and the accuracy of corners.

6. Method according to claim 1, characterized by the fact that specific control data for the respective machine is transferred to another machine tool and checked with respect to its compatibility.

7. Method according to claim 1, characterized by the fact that the control device checks for possible negative effects of the interruption, e.g., on the machining quality, the displacement paths for retracting the wire guide heads of an erosive cutting machine, etc., before an intentional interruption of the machining.

8. A method for controlling a machine tool, said method comprising the steps of:
   a) providing a control device for controlling a machine tool, said device comprising at least one memory for storing control data characterizing the instantaneous operating state of the machine tool during machining, the control data comprising dynamic control data and static control data, said control device further comprising a memory management device for managing the control data such that machining can be resumed after an interruption;

b) storing the static and dynamic control data in said at least one memory;

c) machining a workpiece;

d) continuously storing the instantaneous operating state of the machining tool during the machining step; and e) if an intentional interruption is requested in the machining step, checking for possible negative effects of an interruption prior to interrupting the machining step.

* * * * *

UNITED STATES PATENT AND TRADEMARK OFFICE
CERTIFICATE OF CORRECTION

PATENT NO. : 5,984,506
DATED : Nov. 16 1999
INVENTOR(S) : Fabrizio Robbiani et al.

It is certified that error appears in the above-identified patent and that said Letters Patent are hereby corrected as shown below:

Front Page, Foreign Application Priority Data - Replace "196 14 201" with --196 14 201.6--

Column 2, line 29 - "SUMMARY OF THE INVENTION" should move down one paragraph

Column 2, line 60 - Replace "geometrical accuracy" with --position--

Column 2, line 61 - Replace "position" with --geometerical accuracy--

Column 5, line 32 - Replace "machinng" with --machining--

Column 6, line 45 - After "machining" delete --,--

Column 6, line 47 - After "machining" start new paragraph

Signed and Sealed this

Third Day of April, 2001

*Attest:*

NICHOLAS P. GODICI

*Attesting Officer*  Acting Director of the United States Patent and Trademark Office